(12) United States Patent
Kataoka et al.

(10) Patent No.: US 6,721,753 B1
(45) Date of Patent: Apr. 13, 2004

(54) FILE PROCESSING METHOD, DATA PROCESSING APPARATUS, AND STORAGE MEDIUM

(75) Inventors: Masahiro Kataoka, Kawasaki (JP); Takashi Tsubokura, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/319,742

(22) PCT Filed: Oct. 20, 1998

(86) PCT No.: PCT/JP98/04736
§ 371 (c)(1),
(2), (4) Date: Jun. 11, 1999

(87) PCT Pub. No.: WO99/21092
PCT Pub. Date: Apr. 29, 1999

(30) Foreign Application Priority Data

Oct. 21, 1997  (JP) .............................................. 9-288559

(51) Int. Cl.[7] .............................................. G06F 17/30
(52) U.S. Cl. ...................................................... 707/101
(58) Field of Search ............................... 707/1–10, 102, 707/101, 104.1; 341/51

(56) References Cited

U.S. PATENT DOCUMENTS

| | | | | |
|---|---|---|---|---|
| 5,333,313 A | * | 7/1994 | Heising | 707/1 |
| 5,506,580 A | * | 4/1996 | Whiting et al. | 341/51 |
| 5,953,723 A | * | 9/1999 | Linoff et al. | 707/102 |
| 6,278,992 B1 | * | 8/2001 | Curtis et al. | 707/3 |

FOREIGN PATENT DOCUMENTS

| | | | | |
|---|---|---|---|---|
| JP | 6-28150 | 2/1994 | | |
| JP | 6-22903 | 8/1994 | | |
| JP | 6-222903 | 8/1994 | | |
| JP | 7-191822 | 7/1995 | | |
| JP | 8-241325 | 9/1996 | | |
| JP | 9-26969 | 1/1997 | | |
| JP | 09026902 A | * | 1/1997 | G06F/5/00 |
| JP | 9-026902 | 1/1997 | | |
| WO | 99/21092 | 4/1999 | | |

* cited by examiner

Primary Examiner—Diane D. Mizrahi
Assistant Examiner—Apu M Mofiz
(74) Attorney, Agent, or Firm—Staas & Halsey LLP

(57) ABSTRACT

A file processing method, a data processing apparatus and a storage medium divide data and index data with respect to the data into a plurality of sections, and compress the sections to obtain a compressed file, and store the compressed file in a storage medium together with address information of the sections after the compression.

47 Claims, 9 Drawing Sheets

FILE PROCESSING METHOD, DATA PROCESSING APPARATUS, AND STORAGE MEDIUM

TECHNICAL FIELD

The present invention generally relates to file processing methods, data processing apparatuses and storage mediums, and more particularly to a file processing method and a data processing apparatus which compress a file such as a dictionary file related to one or a plurality of dictionaries, encyclopedias and the like, store the compressed file in a storage medium and read the stored file from the storage medium, and to a storage medium which stores a file such as a compressed dictionary file.

Recently, there are storage mediums such as a CD-ROM which prestores information related to a dictionary, encyclopedia or the like. By making access to such a CD-ROM from a computer, it is possible to read and display the information related to the dictionary, encyclopedia or the like. As a result, a large amount of information related to the dictionary, encyclopedia or the like can be stored in a single CD-ROM which is extremely compact. In addition, instead of obtaining the necessary information by opening a dictionary, encyclopedia or the like while using a computer, the necessary information can be read from the CD-ROM, thereby making it possible to greatly reduce the time and trouble to obtain the necessary information.

BACKGROUND ART

In a conventional CD-ROM which stores the information related to the dictionary, encyclopedia or the like, a dictionary file is made up of a dictionary data and a data related to index (hereinafter referred to as an index data). For example, in the case of an encyclopedia, the dictionary data includes a data (hereinafter referred to as a text data) related to a text which explains the meaning of a word, a data (hereinafter referred to as an image data) related to an image showing an animal if the word describes the animal, for example, a data (hereinafter referred to as an audio data) related to a sound such as a singing of a bird if the word describes the bird, for example, and the like. On the other hand, the index is used to retrieve a desired dictionary data from the dictionary file, and is provided with respect to the dictionary data. The index is sometimes also referred to as a keyword. The index data includes a pointer related to a heading, a pointer related to an item, and the like. The data related to the heading includes a headword. Further, the data related to the item includes a headword, comment, and the like.

Conventionally, because the storage capacity of the CD-ROM is relatively large, the text data and the index data are stored in the CD-ROM without being compressed. On the other hand, the amount of information included in the audio data and particularly the image data is large, and the audio data and the image data are respectively compressed according to appropriate compression techniques before being stored in the CD-ROM.

However, if one CD-ROM is required for each dictionary or encyclopedia, it is troublesome to utilize the dictionary data. For this reason, it is desirable to store the information related to a plurality of dictionaries, encyclopedias or the like in a single CD-ROM, but in this case, there was a problem in that the amount of information to be stored may exceed the storage capacity of the single CD-ROM even if the dictionary data is compressed. In addition, even in a case where the dictionary file to be stored in the CD-ROM relates to a single dictionary, encyclopedia or the like, as the amount of information of the dictionary file increases, the amount of information to be stored may exceed the storage capacity of the single CD-ROM even when the dictionary data is compressed.

Accordingly, it is conceivable to not only compress the dictionary data but to compress the entire dictionary file, including the index data, when storing the information related to the dictionary, encyclopedia or the like in the CD-ROM. But no method which is capable of efficiently compressing the entire dictionary file by a relatively simple technique and capable of expanding the compressed dictionary file in a short time has yet been proposed. Particularly in the case of the dictionary, encyclopedia or the like, the amount of information related to the index data is large. For this reason, if it takes a long time to carry out the process of restoring the index data when expanding the compressed dictionary file, an access time to the desired index data or dictionary data becomes long, thereby deteriorating the convenience of the dictionary, encyclopedia or the like.

Moreover, when compressing the dictionary data in units of the item of the index or in units of a fixed length, for example, it takes a long time to carry out the process of expanding the dictionary file because the amount of information related to the index data is large particularly in the case of the dictionary, encyclopedia or the like, thereby similarly deteriorating convenience of the dictionary, encyclopedia or the like. For example, a Japanese Laid-Open Patent Application No.9-26969 proposes a telephone directory retrieval system which employs a method similar to the above. However, this proposed method does not compress the index data. In the case of the telephone directory, the amount of information related to the index data is small compared to the amount of information related to the telephone number, family name, given name, corporate name and address which correspond to the dictionary data. Consequently, the information compression efficiency as a whole will not greatly improve even if the index data of the telephone directory were compressed. Therefore, even if this proposed method were applied to the storage of the information related to the dictionary, encyclopedia or the like into the storage medium, the information compression efficiency of the dictionary file as a while will not improve considerably.

Accordingly, in a case where the amount of information related to the index data is relatively large even when compared to the amount of information related to the dictionary data, such as the case of the dictionary, encyclopedia or the like, there was a problem in that it is conventionally impossible to efficiently compress and store the dictionary file in the storage medium and to make access to the compressed dictionary file in a short time by a relatively simple process.

DISCLOSURE OF THE INVENTION

Hence, it is an object of the present invention to provide a file processing method, a data processing apparatus and a storage medium which are capable of efficiently compressing and storing a dictionary file in the storage medium and making access to the compressed dictionary file in a short time by a relatively simple process, even in a case where the amount of information related to an index data is large even when compared to the amount of information related to a dictionary data, such as the case of a dictionary, encyclopedia or the like.

Another object of the present invention is to provide a file processing method comprising a compressing step dividing data and index data with respect to the data into a plurality of sections, and compressing the sections to obtain a compressed file, and a storing step storing the compressed file in a storage medium together with address information of the sections after the compression. According to the present invention, it is possible to efficiently compress and store in the storage medium a file such as a dictionary file which is formed by data including an index, text of each item and the like. In addition, it is possible to carry out a file retrieval at a high speed by a relatively simple process, by expanding the compressed file for every section.

When each section has a fixed length, it becomes unnecessary to include address information prior to the compression in the compressed file, and the data compression efficiency can be improved. On the other hand, when each section has a variable length, and said storing step further stores address information prior to the compression in the storage medium, it is possible to carry out the data expansion at a high speed by setting the section to an appropriate length depending on the data type and section.

When the file processing method further comprises a restoring step reading the compressed file from the storage medium and expanding each of the sections, so as to restore the data and the index data, it is possible to improve the file retrieval speed by using an auxiliary storage unit capable of making a high-speed data access and storing the restored data and index data in the auxiliary storage unit.

When the compressing step uses a compression algorithm and a compression parameter which are common to the data and the index data of each of the sections, it is possible to simplify the data compression process and the data expansion process at the time of the data expansion by using the common compression algorithm and compression parameter. More particularly, it is possible to use the Huffman code, the universal code and the like as the compression algorithm.

Still another object of the present invention is to provide a file processing method comprising a reading step reading a compressed file from a storage medium together with address information of each of a plurality of sections after compression, for each of the sections, said compressed file being obtained by dividing data and index data with respect to the data into the sections and compressing the sections, and a restoring step expanding the compressed file and restoring the data and the index data. According to the present invention, it is possible to carry out a high-speed file retrieval by a relatively simple process, by carry out the expansion of the compressed file such as a compressed dictionary file for every section.

A further object of the present invention is to provide a data processing apparatus comprising compressing means for dividing data and index data with respect to the data into a plurality of sections, and compressing the sections to obtain a compressed file, and storing means for storing the compressed file in a storage medium together with address information of the sections after the compression. According to the present invention, it is possible to efficiently compress and store in the storage medium a file which is formed by data including an index, text of each item and the like. In addition, it is possible to carry out a file retrieval at a high speed by a relatively simple process, by expanding the compressed file for every section.

Another object of the present invention is to provide a data processing apparatus comprising reading means for reading a compressed file from a storage medium together with address information of each of a plurality of sections after compression, for each of the sections, said compressed file being obtained by dividing data and index data with respect to the data into the sections and compressing the sections, and restoring means for expanding the compressed file and restoring the data and the index data. According to the present invention, it is possible to carry out a high-speed file retrieval by a relatively simple process, by carry out the expansion of the compressed file for every section.

Still another object of the present invention is to provide a storage medium which stores computer-readable information, comprising reading means for causing a computer to read a compressed file from a storage medium together with address information of each of a plurality of sections after compression, for each of the sections, said compressed file being obtained by dividing data and index data with respect to the data into the sections and compressing the sections, and restoring means for causing the computer to expand the compressed file and restore the data and the index data. According to the present invention, it is possible to carry out a high-speed file retrieval by a relatively simple process, by carry out the expansion of the compressed file for every section.

A further object of the present invention is to provide a storage medium which stores computer-readable information, comprising a compressed file stored together with address information of each of a plurality of sections after compression, for each of the sections, said compressed file being obtained by dividing data and index data with respect to the data into the sections and compressing the sections, where said compressed file is compressed using a compression algorithm and a compression parameter which are common to the data and the index data of each of the sections. According to the present invention, it is possible to efficiently compress and store a file in the storage medium. In addition, it is possible to carry out a file retrieval at a high speed by a relatively simple process, by expanding the compressed file for every section.

Another object of the present invention is to provide a storage medium which stores computer-readable information, including a program which causes a computer to carry out a compressing procedure for dividing dictionary data and index data with respect to the dictionary data into a plurality of sections, and compressing the sections to obtain a compressed dictionary file, and a storing procedure for storing the compressed dictionary file in the storage medium together with address information of the sections after the compression. According to the present invention, it is possible to retrieve the file at a high speed by carrying out a relatively simple process.

Still another object of the present invention is to provide a computer-readable storage medium storing a compressed file comprising a compressed data region storing compressed data obtained by dividing data and index data with respect to the data into a plurality of sections and compressing the sections, and an address information region storing address information after compression of the sections, and a compression parameter region storing a compression parameter used for the compression. According to the present invention it is possible to retrieve the file by carrying out a relatively simple process.

Therefore, according to the present invention, even in when the amount of information related to the index data is large even when compared with the amount of information related to the dictionary data, such as the case of the dictionary, encyclopedia and the like, it is possible to efficiently compress and store the file such as the dictionary file in the storage medium, and the file such as the compressed dictionary file can be accessed within a short time by carrying out the relatively simple process.

Other objects and further features of the present invention will be apparent from the following detailed description when read in conjunction with the accompanying drawings.

BEST MODE OF CARRYING OUT THE INVENTION

A description will be given of an embodiment of a file processing method according to the present invention and an embodiment of a data processing apparatus according to the present invention. This embodiment of the file processing method and this embodiment of the data processing apparatus employ an embodiment of a storage medium according to the present invention. In this embodiment of the storage medium, the present invention is applied to a CD-ROM. However, the present invention is of course similarly applicable to optical information storage mediums other than the CD-ROM, magneto-optical storage mediums such as a magneto-optical disk, magnetic storage mediums such as a floppy disk, and various kinds of semiconductor memory devices.

Figure 1:
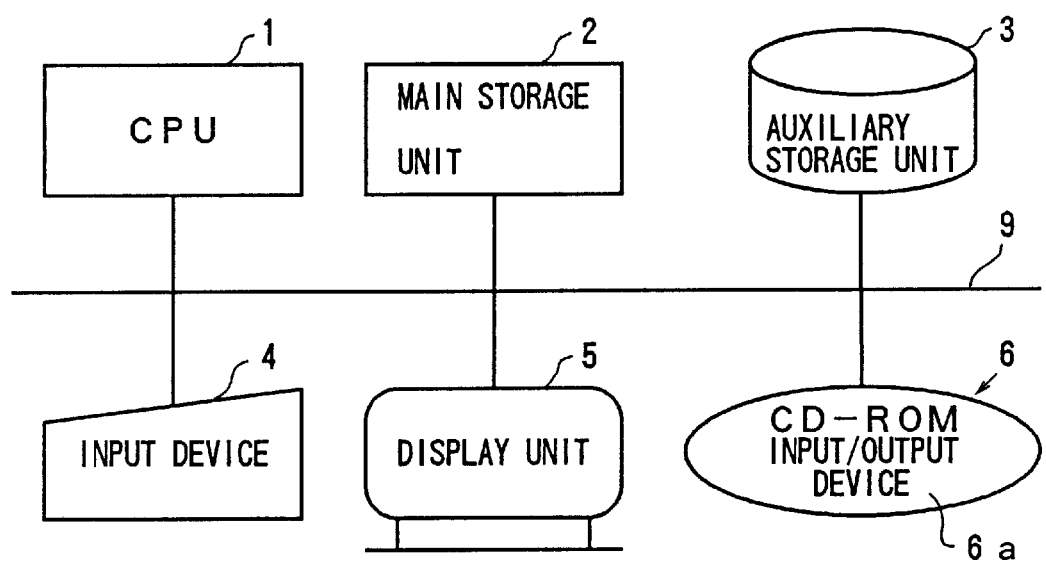
FIG. 1 is a system block diagram showing the general construction of a computer system which employs an embodiment of a file processing method.

FIG. 1 is a system block diagram showing the general construction of a computer system applied with this embodiment of the file processing method, and corresponds to this embodiment of the data processing apparatus. The computer system shown in FIG. 1 generally includes a central processing unit (CPU) 1, a main storage unit 2 made up of a random access memory (RAM) or the like, an auxiliary storage unit 3 made up of a hard disk drive or the like, an input device 4 made up of a keyboard, mouse or the like, a display unit 5, and a CD-ROM input/output device 6 made up of a CD-ROM drive or the like, which are coupled via a bus 9. Each element itself forming the computer system can be realized by an element having a known construction.

The input device 4 is used to input instructions and data to the CPU 1. The CPU 1 carries out a process requested by a user by executing a program stored in the auxiliary storage unit 3 based on the instructions and data which are input. The program stored in the auxiliary storage unit 3 may be pre-installed or, may be loaded from a CD-ROM 6a which is loaded into the CD-ROM input/output device 6. The main storage unit 2 is used to temporarily store intermediate results of computing processes or the like carried out by the CPU 1, data used by the operations, and the like. The display unit 5 displays a result of the process carried out by the CPU 1, and messages urging the user to input an instruction or data. It is possible to connect a printer (not shown) which prints the result of the process carried out by the CPU 1 or the like, in place of the display unit 5 or in addition to the display unit 5.

First, a description will be given of a file storing process which stores a dictionary file of a dictionary, encyclopedia or the like into the CD-ROM 6a which is loaded into the CD-ROM input/output device 6. The file storing process generally includes a compression parameter computing process, a data compression process for compressing an index, text and the like, an address information computing process, a compressed file composing process, and a compressed file storing process. In this embodiment, it is assumed for the sake of convenience that a program for causing the CPU 1 to carry out the file storing process is stored in the CD-ROM 6a, and that the CPU 1 reads this program from the CD-ROM 6a by a known method and loads this program into the auxiliary storage unit 3. In addition, it is assumed for the sake of convenience that the dictionary file related to the dictionary, encyclopedia or the like is transferred from a host unit (not shown) and is stored in the auxiliary storage unit 3 via the bus 9 or, read from a CD-ROM different from the CD-ROM 6a by the CD-ROM input/output device 6 and is stored in the auxiliary storage unit 3 via the bus 9.

Figure 2:
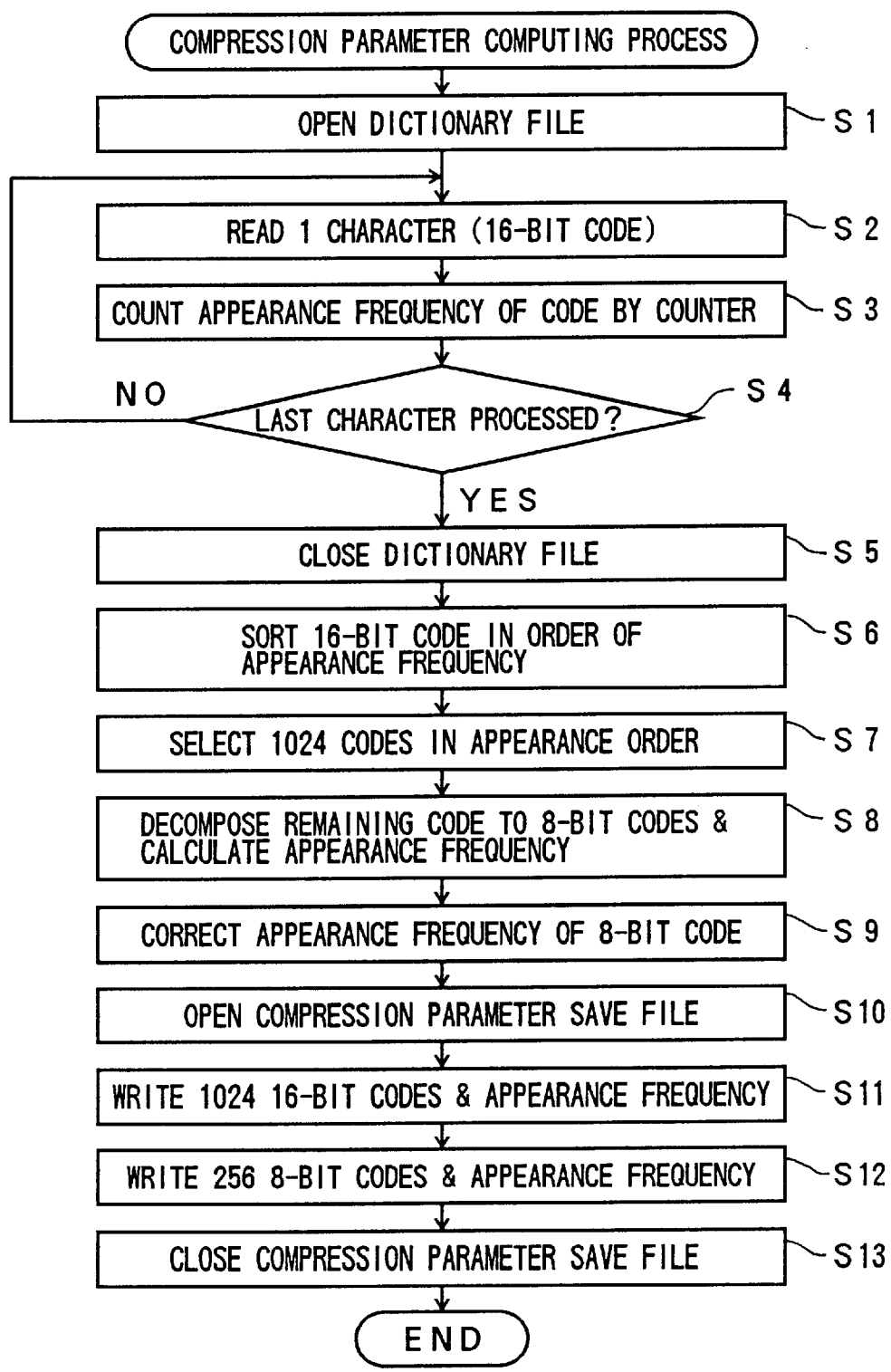
FIG. 2 is a flow chart for explaining a compression parameter computing process carried out by a CPU.

1a) Compression Parameter Computing Process:

FIG. 2 is a flow chart for explaining the compression parameter computing process carried out by the CPU 1. In FIG. 2, a step S1 makes access to the auxiliary storage unit 3 and opens a dictionary file. A step S2 reads 1 character, that is, a 16-bit code, for example, from the dictionary file. A step S3 counts an appearance frequency of the read 16-bit code by use of an appearance frequency counter within the CPU 1. A step S4 decides whether or not a last character of the dictionary file is processed, and the process returns to the step S2 if the decision result in the step S4 is NO.

On the other hand, if the decision result in the step S4 is YES, a step S5 closes the dictionary file. A step S6 sorts the 16-bit codes depending on the order of the appearance frequency, and a step S7 selects 1024 16-bit codes, for example, depending on the order of the appearance frequency. A step S8 decomposes the remaining non-selected 16-bit codes into 8-bit codes, and calculates the appearance frequency of the 8-bit code. A step S9 corrects the appearance frequency of the 8-bit code with respect to the appearance frequency of the 16-bit code, by setting the appearance frequency of the 8-bit code to approximately ½.

A step S10 opens a compression parameter save file for the compression parameter in the auxiliary storage unit 3. A step S11 writes the 1024 16-bit codes and the appearance frequency thereof in the compression parameter save file. In addition, a step S12 writes 256 8-bit codes and the appearance frequency thereof in the compression parameter save file. A step S13 closes the compression parameter save file, and the process ends.

Figure 3:
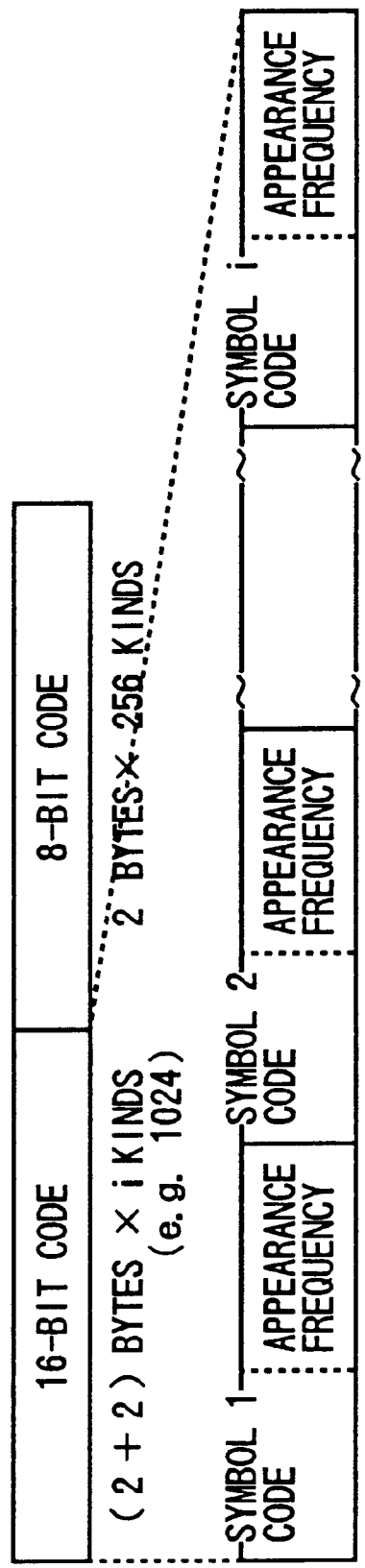
FIG. 3 is a diagram showing a data structure of the compression parameter.

FIG. 3 is a diagram showing the data structure of the compression parameter. As shown in FIG. 3, in the case of a compression using the Huffman code, the compression parameter includes 256 kinds of appearance frequencies for each of the 1024 kinds of 16-bit codes, and 256 kinds of appearance frequencies for each of the 8-bit codes, for example. The appearance frequencies become data which are used to generate a Huffman tree. In the case of a compression using the universal code, the compression parameter includes a try tree or data such as registered symbol examples and reference numbers thereof which are used to generate the try tree.

Figure 4:
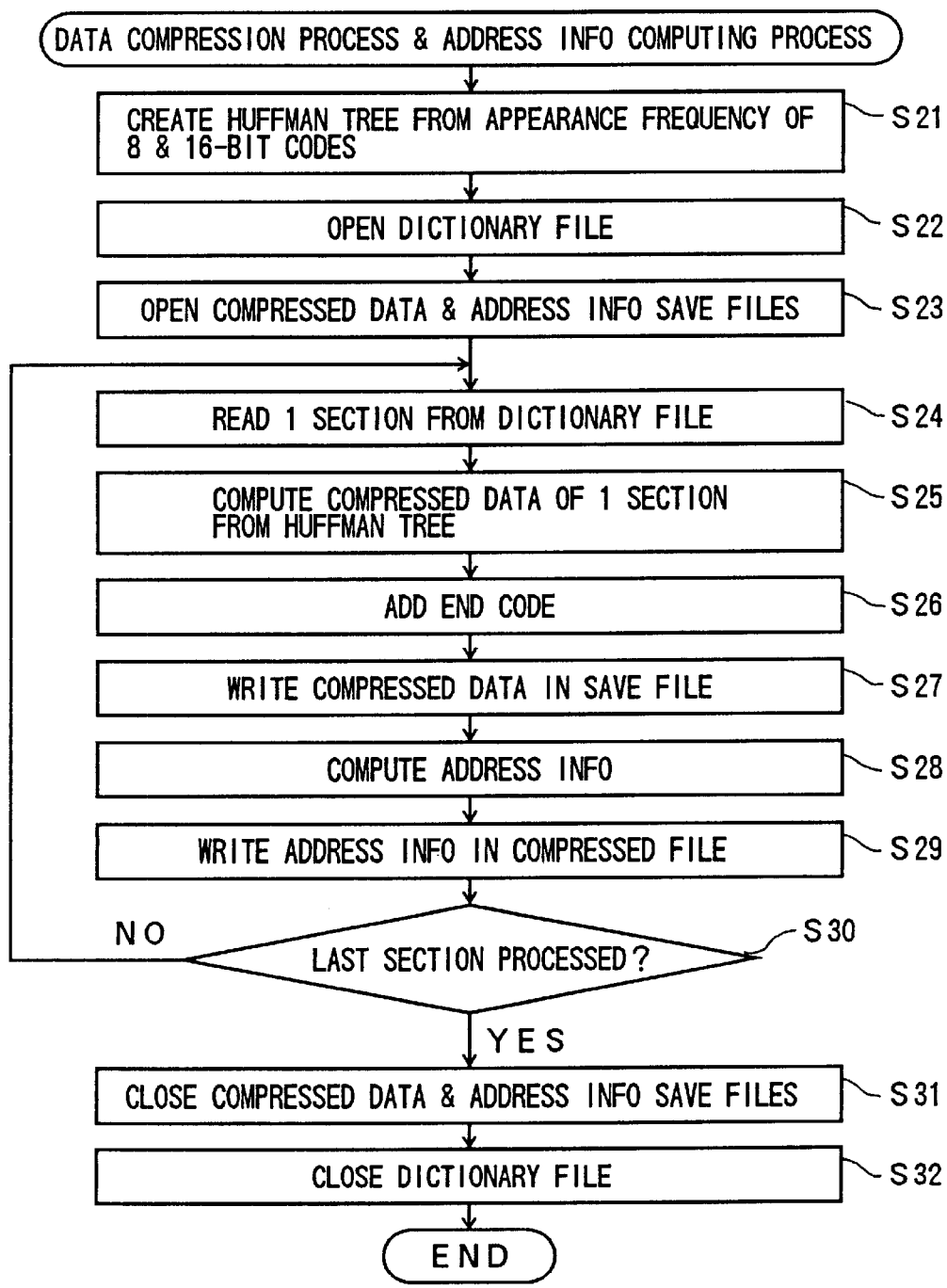
FIG. 4 is a flow chart for explaining a data compression process and an address information computing process carried out by the CPU.

1b) Data Compression Process and Address Information Computing Process:

FIG. 4 is a flow chart for explaining the data compression process and the address information computing process carried out by the CPU 1. In FIG. 4, a step S21 creates a conversion table, that is, a Huffman tree since this embodiment carries out a Huffman compression, based on the appearance frequencies of the 8-bit codes and the 16-bit codes. A step S22 opens the dictionary file within the auxiliary storage unit 3. A step S23 opens a compressed data save file for the compressed data and an address information save file for the address information, within the auxiliary storage unit 3.

A step S24 reads 1 section from the dictionary file. This section may have a fixed length or a variable length, but in this embodiment, it is assumed for the sake of convenience that this section has a fixed length. This section is sometimes also referred to as a block. A step S25 computes the compressed data of 1 section using the Huffman tree. A step S26 adds an end code to the end of 1 section. In addition, a step S27 writes the compressed data in the compressed data save file.

A step S28 computes the address information related to the address where the above described section is stored. For example, when the section has the fixed length, the address information is computed based on a section number which is assigned with respect to each section. A step S29 writes the address information in the address information save file. A step S30 decides whether or not a last section is processed, and the process returns to the step S24 if the decision result in the step S30 is NO. For example, it is possible to decide whether or not the last section is processed, based on a last section code which is added to the section number or the last section.

On the other hand, if the decision result in the step S30 is YES, a step S31 closes the save file for the compressed data and closes the address information save file. In addition, a step S32 closes the dictionary file, and the process ends.

Figure 5:
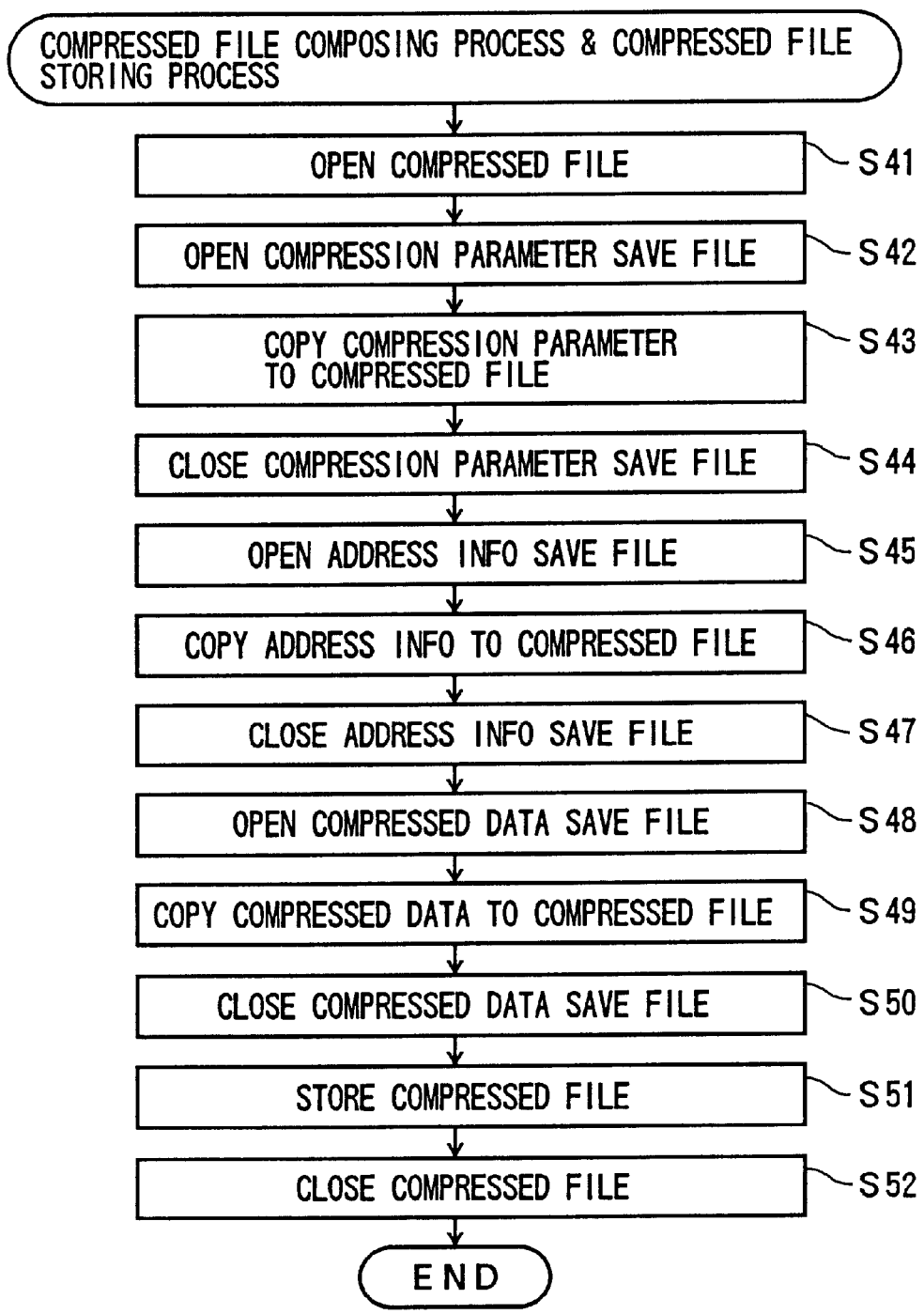
FIG. 5 is a flow chart for explaining a compressed file composing process and a compressed file storing process carried out by the CPU.

1c) Compressed File Composing Process and Compressed File Storing Process:

FIG. 5 is a flow chart for explaining the compressed file composing process and the compressed file storing process carried out by the CPU 1. In FIG. 5, a step S41 opens a compressed file within the auxiliary storage unit 3. A step S42 opens the compression parameter save file within the auxiliary storage unit 3, and a step S43 copies the compression parameter within the compression parameter save file to the compressed file. A step S44 closes the compression parameter save file.

A step S45 opens the address information save file within the auxiliary storage unit 3, and a step S46 copies the address information in the address information save file to the compressed file. A step S47 closes the address information save file. Furthermore, a step S48 opens the compressed data save file within the auxiliary storage unit 3, and a step S49 copies the compressed data in the compressed data save file to the compressed file. A step S50 closes the compressed data save file. A step S51 stores the compressed file in the CD-ROM 6a by the CD-ROM input/output device 6. In addition, a step S52 closes the compressed file, and the process ends.

Figure 6:
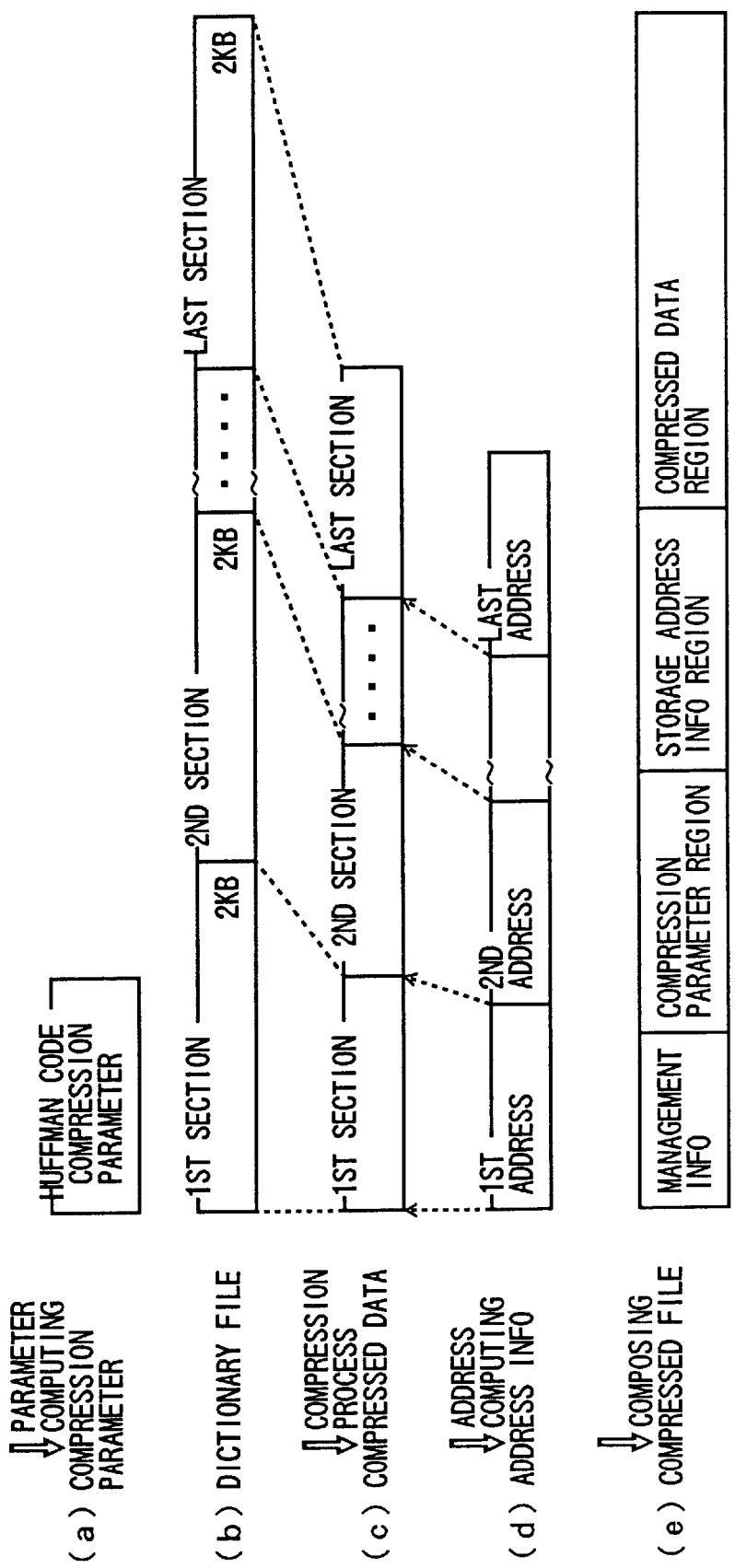
FIG. 6 is a diagram for explaining the composing of the compressed files.

FIG. 6 is a diagram for explaining the composing of the compressed file with reference to 1a) the compression parameter computing process, 1b) the data compression process and the address information computing process, and 1c) the compressed file composing process and the compressed file storing process described above. In FIG. 6, (a) shows the compression parameter. In this embodiment, the compression parameter is used to carry out the compression using the Huffman code. In FIG. 6, (b) shows the sections of the dictionary file. In this embodiment, each section is made up of 2 kbytes, for example, and each section is made up of a dictionary data and an index data. In the case of an encyclopedia, for example, the dictionary data includes a text data related to a text which explains the meaning of a word, an image data related to an image showing an animal if the word describes the animal, for example, an audio data related to a sound such as a singing of a bird if the word describes the bird, for example, and the like. On the other hand, the index is used to retrieve a desired dictionary data from the dictionary file, and is provided with respect to the dictionary data. The index is sometimes also referred to as a keyword. The index data includes a pointer related to a heading, a pointer related to an item, and the like. The data related to the heading includes a headword. Further, the data related to the item includes a headword, comment, and the like.

In FIG. 6, (c) shows the compressed data, in a state where each section has a fixed length or a variable length and is compressed. Furthermore, in FIG. 6, (d) shows the address information computed with respect to each section, and (e) shows the compressed file which is obtained by composing the address information and the compressed data and adding management information at a head of the compressed file. The management information includes information used when retrieving the compressed file, such as a dictionary file name, a dictionary file type, and a type of compression used for the dictionary file.

Next, a description will be given of a file retrieval process which retrieves a desired data by reading a compressed file which is stored in the CD-ROM 6a which is loaded into the CD-ROM input/output device 6. The file retrieval process generally includes an index read process and a text read process, and is carried out by calling a data expansion process. In this embodiment, it is assumed for the sake of convenience that a program for causing the CPU 1 to carry out the file retrieval process is stored in the CD-ROM 6a, and that the CPU 1 reads this program and the compressed file from the CD-ROM 6a by a known method and loads the read program and compressed file into the auxiliary storage unit 3.

Figure 7:
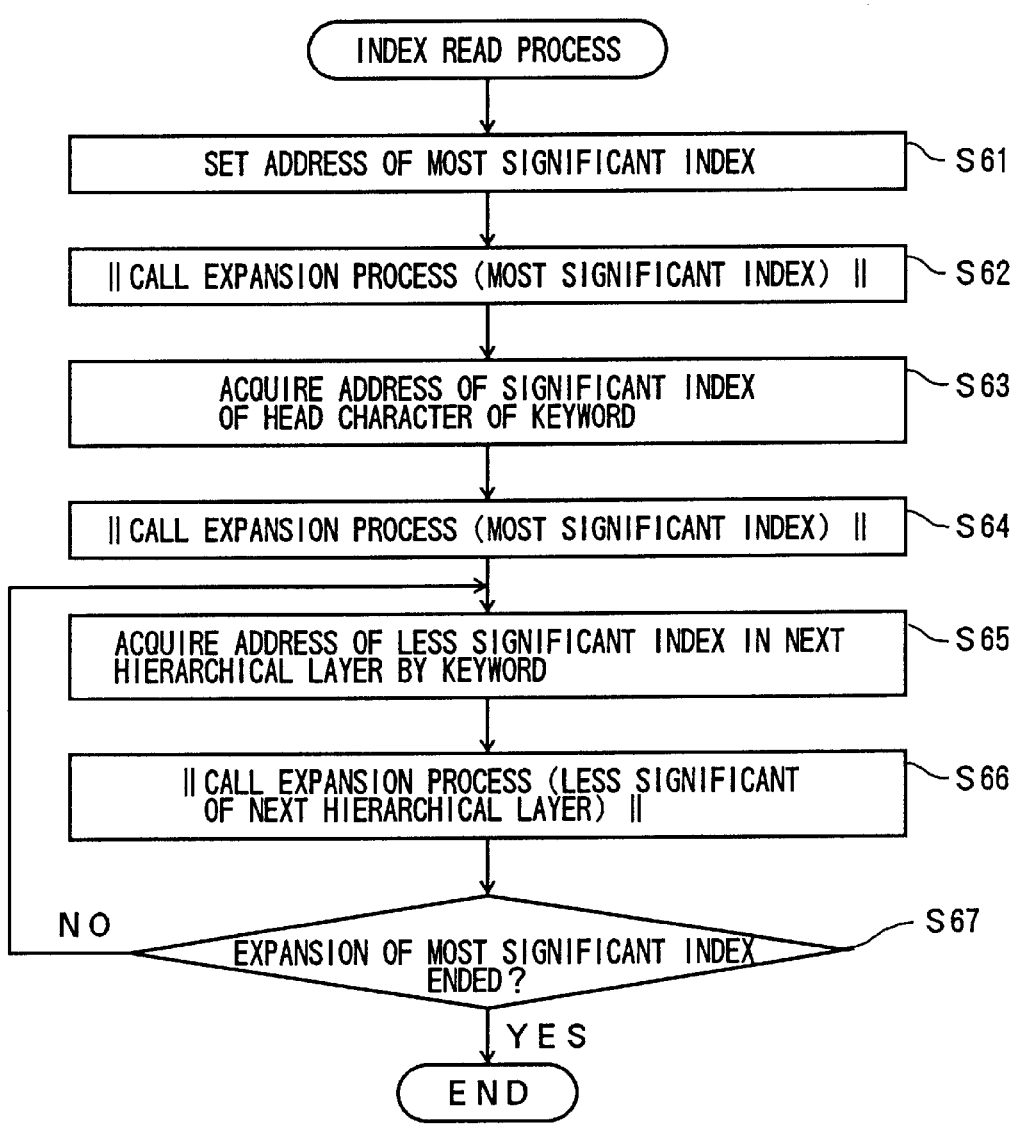
FIG. 7 is a flow chart for explaining an index read process carried out by the CPU.

2a) Index Read Process:

FIG. 7 is a flow chart for explaining the index read process carried out by the CPU 1. In FIG. 7, a step S61 sets address information of a most significant index, based on the index data input by the user via the input device 4. A step S62 calls the expansion process, and reads a routine for carrying out the expansion process from the program which is stored in the auxiliary storage unit 3 and causes the CPU 1 to carry out the file retrieval process, so as to expand the address of the most significant index within the compressed file. A step S63 acquires the address of a significant index, that is, the head character of the most significant index, based on the index data. A step S64 calls the expansion process, and expands the address of the significant index within the compressed file.

A step S65 acquires the address of a less significant index in a next hierarchical layer, based on the index data. A step S66 calls the expansion process, and expands the address of the less significant index in the next hierarchical layer described above within the compressed file. A step S67 decides whether or not the expansion of the address of a least significant index has ended, and the process returns to the step S65 if the decision result in the step S67 is NO. On the other hand, the process ends if the decision result in the step S67 is YES.

Figure 8:
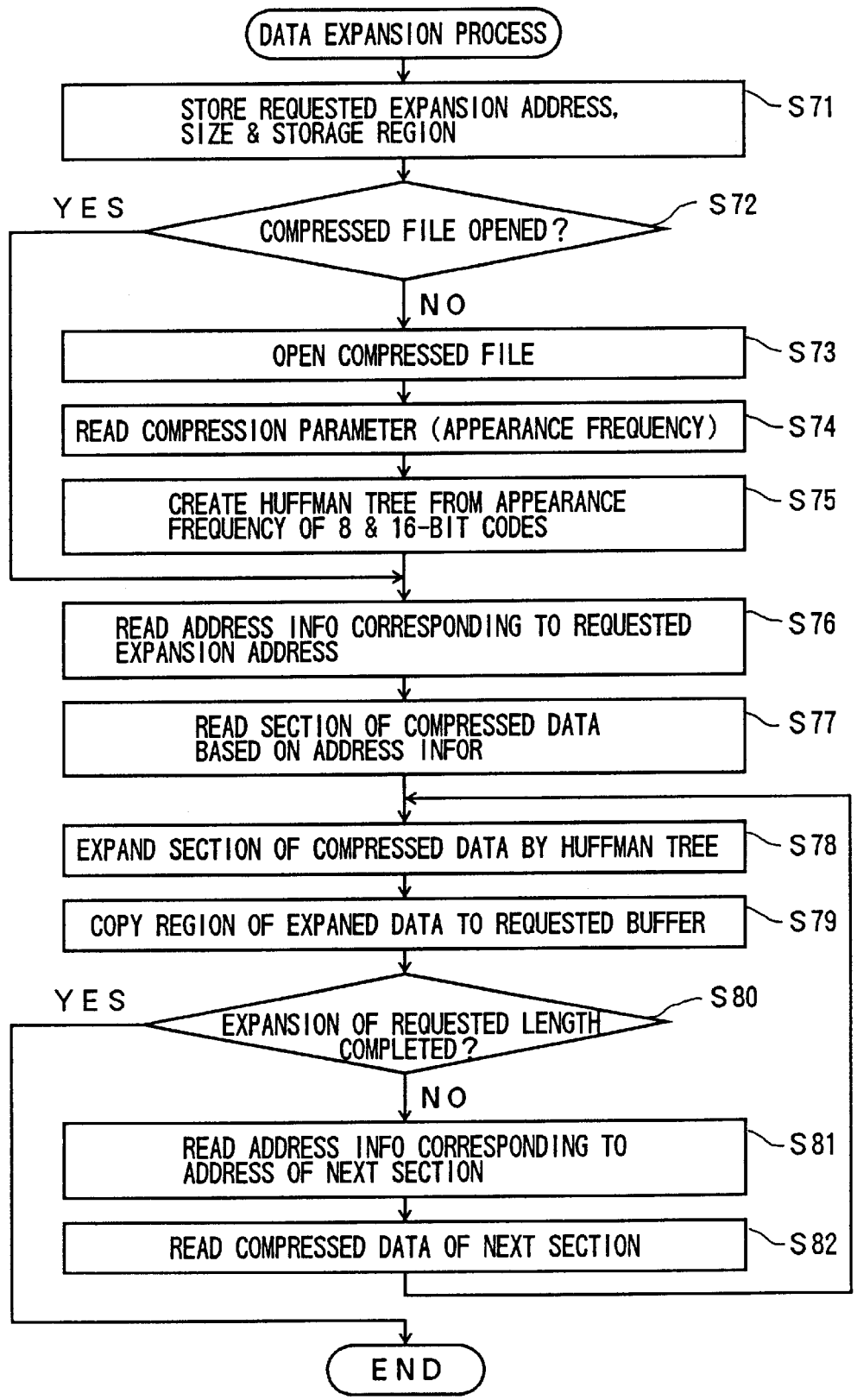
FIG. 8 is a flow chart for explaining a data expansion process carried out by the CPU.

2b) Data Expansion Process:

FIG. 8 is a flow chart for explaining the data expansion process carried out by the CPU 1. The data expansion process is called by the index read process and the text read process. In FIG. 8, a step S71 stores the requested expansion address, data size and storage region in the auxiliary storage unit 3, based on the index data which is input by the user via the input device 4, so as to prepare a sufficiently large storage region within the auxiliary storage unit 3 with respect to the expanded data size. A step S72 decides whether or not the compressed file which is read from the CD-ROM 6a and loaded into the auxiliary storage unit 3 is open. If the decision result in the step S72 is NO, a step S73 opens the compressed file within the auxiliary storage unit 3. A step S74 reads the compression parameter from the compressed file, and reads the appearance frequency of the 8-bit code within the compression parameter, the 16-bit code within the compression parameter, and the appearance frequency of the 16-bit code. A step S75 creates a Huffman tree based on the appearance frequency of the 8-bit code and the appearance frequency of the 16-bit code, and the process advances to a step S76 which will be described later. A judging flag for judging whether the code is the 8-bit code or the 16-bit code is added to the data of the leaf of the Huffman tree.

If the decision result in the step S72 is YES or after the step S75, the step S76 reads the address information corresponding to the requested expansion address, from the compressed file. A step S77 reads the section of the corresponding compressed data from the compressed file, based on the address information. A step S78 expands the section of the compressed data by use of the Huffman tree. A step S79 copies the expanded data to the storage region described above, based on the judging flag which indicates whether the code is the 8-bit code or the 16-bit code. Further, a step S80 decides whether or not the expansion of the requested data size is completed with respect to the compressed file.

If the decision result in the step S80 is NO, a step S81 reads the address information corresponding to the expansion address of the next section, from the compressed file. The step S82 reads the section of the corresponding compressed data from the compressed file, based on the address information corresponding to the expansion address of this next section, and the process returns to the step S78. On the other hand, the process ends if the decision result in the step S80 is YES.

Figure 9:
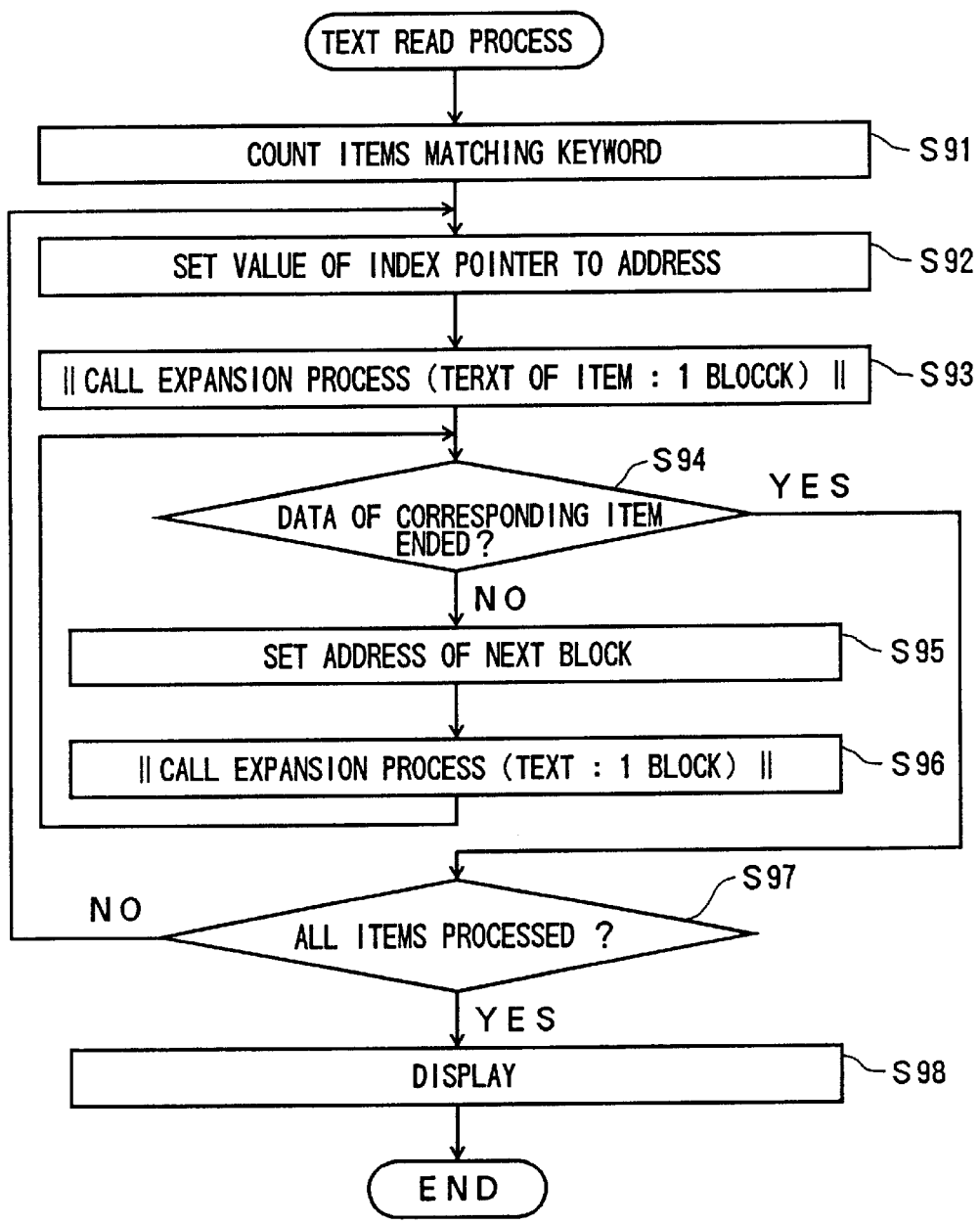
FIG. 9 is a flow chart for explaining a text read process carried out by the CPU.

2c) Text Read Process:

FIG. 9 is a flow chart for explaining the text read process carried out by the CPU 1. In FIG. 9, a step S91 counts the items matching the index, within the expanded data, based on the index data input by the user via the input device 4. A step S92 sets a value of an item pointer of the index to the address, based on the input index data. A step S93 calls the expansion process, and reads a routine for carrying out the expansion process from the program which is stored within the auxiliary storage unit 3 and causes the CPU 1 to carry out the file retrieval process, so as to expand the text indicated by the item pointer within the compressed file, that is, to expand the dictionary data amounting to 1 section.

A step S94 decides whether or not the dictionary data indicated by the item pointer has ended. If the decision result in the step S94 is NO, a step S95 sets the address of a next 1 section. In addition, a step S96 calls the expansion process, and expands the dictionary data amounting to this next 1 section indicated by the item pointer within the compressed file, and the process returns to the step S94. On the other hand, if the decision result in the step S94 is YES, a step S97 decides whether or not the process with respect to all of the items has ended, based on the input index data. The process returns to the step S92 if the decision result in the step S97 is NO. On the other hand, if the decision result in the step 97 is YES, a step S98 displays on the display unit 5 the dictionary data which is expanded for all of the items, and the process ends.

It is possible to carry out the step S98 before the step S97. In this case, the step S98 displays the dictionary data which is expanded for each item on the display unit 5 each time the dictionary data is expanded for each item.

In the embodiment described above, it is assumed for the sake of convenience that the section has the fixed length. In this case, the data compression efficiency is satisfactory, and it is possible to restore the address information from the compressed file without the need to store the address information prior to the compression of the section in the compressed file. This is because the section has the fixed length, and the section number is added to each section, thereby making it possible to calculate a relative position of each section with respect to another section.

On the other hand, when the section has a variable length, it is possible to improve the data expansion rate. This is because the length of the section can be set appropriately depending on the kind of data and section, thereby eliminating the need to expand excess data. In this case where the section has the variable length, it is necessary to store the address prior to the compression of the section in the compressed file. Accordingly, it is possible to make the section have the fixed length or the variable length, depending on whether the priority is to be given to the data compression efficiency or the data expansion rate.

In addition, one or more dictionary files may be stored in the CD-ROM 6a. When a plurality of dictionary files related to a plurality of dictionaries, encyclopedias and the like are stored in the CD-ROM 6a, it is possible to specify the dictionary which is to be retrieved, using the dictionary file name or the dictionary file type within the management information shown in (e) of FIG. 6.

Furthermore, although the embodiment described above employs the Huffman code for the data compression, it is of course possible to use coding techniques other than the technique using the Huffman code, such as the technique using the universal code, as long as the employed data compression technique is capable of efficiently compressing the dictionary data using a common compression parameter for each of the sections. In addition, the data to be subjected to the data compression and expansion is not limited to the dictionary data, and includes data of a database including the index and data.

Moreover, in the embodiment described above, the file retrieval process is carried out by copying the program for carrying out the file retrieval process and the compressed file to the auxiliary storage unit 3. However, instead of copying the program and the compressed file to the auxiliary storage unit 3, it is possible to develop the program and the compressed file in the main storage unit 2, and carry out a process similarly to that described above.

By employing the compression algorithm of the above described embodiment, it is possible to improve the data compression efficiency compared to the normal data compression process using the Huffman code with 8 bits. As a result, it is possible to reduce the region of the compressed file stored in the storage medium such as the CD-ROM and the hard disk which is used as the auxiliary storage unit. Although the data compression efficiency is improved by this compression algorithm, the processing time required to expand the compressed file remains essentially unchanged from the processing time required to expand the compressed file compressed by the normal data compression process using the Huffman code.

A time required to carry out the file retrieval process is made up of a seek time of the read unit (drive), a read time required to read the compressed file, and a time required to carry out the expansion process.

Since the data compression efficiency is improved by the compression algorithm described above, the reduced region of the compressed file stored in the storage medium enables reduction of the seek time of the file retrieval process. Consequently, the file retrieval speed is improved. This effect of improving the file retrieval speed is becomes more notable as the hardware performance improves.

Further, the present invention is not limited to these embodiments, but various variations and modifications may be made without departing from the scope of the present invention.

What is claimed is:

1. A file processing method comprising:
    dividing data and index data different from and corresponding to the data into a plurality of sections, the index data being used in searching or retrieving the data and each of the sections including both data and index data, the data including at least one element selected from a group consisting of text data, image data and audio data;
    compressing the sections to obtain a compressed file; and
    storing the compressed file in a storage medium together with address information of the sections after compression.

2. The file processing method as claimed in claim 1, wherein each section has a fixed length.

3. The file processing method as claimed in claim 1, wherein each section has a variable length, and said storing further stores address information prior to the compression in the storage medium.

4. The file processing method as claimed in claim 1, which further comprises:
    restoring by reading the compressed file from the storage medium and expanding each of the sections, so as to restore both the data and the index data.

5. The file processing method as claimed in claim 4, which further comprises:
    storing the restored data and the restored index data in an auxiliary storage unit.

6. The file processing method as claimed in claim 1, wherein said compressing uses a compression algorithm and a compression parameter which are common to both the data and the index data of each of the sections.

7. The file processing method as claimed in claim 1, wherein said compressing selects a predetermined number of first bit codes within the data depending on an order of an appearance frequency thereof, decomposes remaining non-selected first bit codes into second bit codes, creates a conversion table based on a result of selecting the second bit codes depending on an order of an appearance frequency thereof, and carries out a data compression based on the conversion table.

8. The file processing method as claimed in claim 1, wherein the data includes dictionary data.

9. A file processing method comprising:
    reading a compressed file from a storage medium together with address information of each of a plurality of sections after compression, for each of the sections, said compressed file being obtained by dividing data and index data different from and corresponding to the data into the sections, the index data being used in searching or retrieving the data and each of the sections including both data and index data, and compressing the sections, the data including at least one element selected from a group consisting of text data, image data and audio data;
    expanding the compressed file; and
    restoring both the data and the index data.

10. The file processing method as claimed in claim 9, which further comprises:
    storing both the restored data and the restored index data in an auxiliary storage unit.

11. The file processing method as claimed in claim 9, wherein said expanding carries out a data expansion based on a conversion table which is obtained at a time of the compression by selecting a predetermined number of first bit codes within the data depending on an order of an appearance frequency thereof, decomposes remaining non-selected first bit codes into second bit codes, and creates the conversion table based on a result of selecting the second bit codes depending on an order of an appearance frequency thereof.

12. The file processing method as claimed in claim 9, wherein each section has a fixed length.

13. The file processing method as claimed in claim 9, wherein each section has a variable length, and address information prior to the compression is stored in the storage medium.

14. The file processing method as claimed in claim 9, wherein the data includes dictionary data.

15. A data processing apparatus comprising:
    a compression unit to divide data and index data different from and corresponding to the data into a plurality of sections, the index data being used in searching or retrieving the data and each of the sections including both data and index data, the data including at least one element selected from a group consisting of text data, image data and audio data, and to compress the sections to obtain a compressed file; and
    a storing unit to store the compressed file in a storage medium together with address information of the sections after compression.

16. The data processing apparatus as claimed in claim 15, wherein each section has a fixed length.

17. The data processing apparatus as claimed in claim 15, wherein each section has a variable length, and said storing unit stores address information prior to the compression in the storage medium.

18. The data processing apparatus as claimed claim 15, which further comprises:
    a restoring unit to read the compressed file from the storage medium and expanding each of the sections, so as to restore both the data and the index data.

19. The data processing apparatus as claimed in claim 18, which further comprises:
    an auxiliary storage unit to store both the restored data and the restored index data.

20. The data processing apparatus as claimed in claim 15, wherein said compression unit uses a compression algorithm and a compression parameter which are common to both the data and the index data of each of the sections.

21. The data processing apparatus as claimed in claim 15, wherein said compression unit selects a predetermined number of first bit codes within the data depending on an order of an appearance frequency thereof, decomposes remaining non-selected first bit codes into second bit codes, creates a conversion table based on a result of selecting the second bit codes depending on an order of an appearance frequency thereof, and carries out data compression based on the conversion table.

22. The data processing apparatus as claimed in claim 15, wherein the data includes dictionary data.

23. A data processing apparatus comprising:
a reading unit to read a compressed file from a storage medium together with address information of each of a plurality of sections after compression, for each of the sections, said compressed file being obtained by dividing data and index data different from and corresponding to the data into the section, the index data being used in searching or retrieving the data and each of the sections including both data and index data, the data including at least one element selected from a group consisting of text data, image data and audio data, and compressing the sections; and
a restoring unit to expand the compressed file and to restore both the data and the index data.

24. The data processing apparatus as claimed in claim 23, which further comprises:
an auxiliary storage unit to store both the restored data and the restored index data.

25. The data processing apparatus as claimed in claim 23, wherein said restoring unit carries out data expansion based on a conversion table which is obtained at a time of the compression by selecting a predetermined number of first bit codes within the data depending on an order of an appearance frequency thereof, decomposes remaining non-selected first bit codes into second bit codes, and creates the conversion table based on a result of selecting the second bit codes depending on an order of an appearance frequency thereof.

26. The data processing apparatus as claimed in claim 23, wherein each section has a fixed length.

27. The data processing apparatus as claimed in claim 23, wherein each section has a variable length, and address information prior to the compression is further stored in the storage medium.

28. The data processing apparatus as claimed in claim 23, wherein the data includes dictionary data.

29. A storage medium which stores computer-readable information causing a computer to read and restore a compressed file by:
reading a compressed file from a storage medium together with address information of each of a plurality of sections after compression, for each of the sections, said compressed file being obtained by dividing data and index data different from and corresponding to the data into the sections, the index data being used in searching or retrieving the data and each of the sections including both data and index data, the data including at least one element selected from a group consisting of text data, image data and audio data, and compressing the sections;
expanding the compressed file; and
restoring both the data and the index data.

30. The storage medium as claimed in claim 29, which further comprises:
storing both the restored data and the restored index data.

31. The storage medium as claimed in claim 29, wherein each section has a fixed length.

32. The storage medium as claimed in claim 29, wherein each section has a variable length, and said reading a compressed file includes reading address information prior to the compression from the storage medium.

33. The storage medium as claimed in claim 29, wherein the compressed file is compressed using a compression algorithm and a compression parameter which are common to both the data and the index data of each of the sections.

34. The storage medium as claimed in claim 29, wherein the data includes dictionary data.

35. A storage medium which stores computer-readable information by:
dividing data and index data different from and corresponding to the data into sections, the index data being used in searching or retrieving the data and each of the sections including both data and index data, the data including at least one element selected from a group consisting of text data, image data and audio data;
compressing each of the sections to obtain a compressed file by using a compression algorithm and a compression parameter which are common to both the data and the index data of each of the sections; and
storing the compressed file together with address information of each of a plurality of the sections after compression.

36. The storage medium as claimed in claim 35, wherein each section has a fixed length.

37. The storage medium as claimed in claim 35, wherein each section has a variable length, and further storing address information prior to the compression.

38. The storage medium as claimed in claim 35, wherein the data includes dictionary data.

39. A storage medium which stores computer-readable information, including a program which causes a computer to carry out:
a compressing procedure dividing dictionary data and index data different from and corresponding to the dictionary data into a plurality of sections, the index data being used in searching or retrieving the dictionary data and each of the sections including both data and index data, the data including at least one element selected from a group consisting of text data, image data and audio data, and compressing the sections to obtain a compressed dictionary file; and
a storing procedure storing the compressed dictionary file in the storage medium together with address information of the sections after compression.

40. The storage medium as claimed in claim 39, wherein each section has a fixed length.

41. The storage medium as claimed in claim 39, wherein each section has a variable length, and said storing procedure further stores address information prior to the compression in the storage medium.

42. The storage medium as claimed in claim 39, wherein the compressed dictionary file is compressed using a compression algorithm and a compression parameter which are common to both the dictionary data and the index data for each of the sections.

43. The storage medium as claimed in claim 39, which further stores a program for causing the computer to carry out:

a procedure reading the compressed dictionary file from the storage medium for each of the sections and expanding the compressed dictionary file, so as to restore both the dictionary data and the index data.

44. The storage medium as claimed in claim 43, which further stores a program for causing the computer to carry out:

a procedure storing both the restored dictionary data and the restored index data in an auxiliary storage unit.

45. The storage medium as claimed in claim 39, which further stores a program for causing the computer to carry out:

a procedure selecting a predetermined number of first bit codes within the dictionary data depending on an order of an appearance frequency thereof, decomposing remaining non-selected first bit codes into second bit codes, creating a conversion table based on a result of selecting the second bit codes depending on an order of an appearance frequency thereof, and carrying out a data compression based on the conversion table.

46. A computer-readable storage medium storing a compressed file comprising:

a compressed data region storing compressed data obtained by dividing data and index data different from and corresponding to the data into a plurality of sections, the index data used in searching or retrieving the data and each of the sections including both data and index data, the data including at least one element selected from a group consisting of text data, image data and audio data, and compressing the sections;

an address information region storing address information after compression of the sections; and a compression parameter region storing a compression parameter used for the compression.

47. The computer-readable storage medium as claimed in claim 46, wherein said compression parameter includes a predetermined number of first bit codes within the data selected depending on an order of an appearance frequency thereof and the appearance frequency of the first bit codes, and second bit codes obtained by decomposing remaining non selected first bit codes depending on an order of an appearance frequency thereof and the appearance frequency of the second bit codes.

\* \* \* \* \*